(12) United States Patent
Knauff

(10) Patent No.: US 6,478,325 B1
(45) Date of Patent: Nov. 12, 2002

(54) WHEEL ATTACHMENT FOR A TRAILER HITCH

(76) Inventor: Edward G. Knauff, 32805 Sylvan Ave., Barstow, CA (US) 92311

( * ) Notice: Subject to any disclaimer, the term of this patent is extended or adjusted under 35 U.S.C. 154(b) by 0 days.

(21) Appl. No.: 09/765,663

(22) Filed: Jan. 22, 2001

(51) Int. Cl.⁷ .................................................. B60D 1/00
(52) U.S. Cl. ..................... 280/507; 280/477; 280/416.1
(58) Field of Search ................... 280/507, 475, 280/DIG. 11, 477, 478.1, 416.1, 479.1, 764.1, 766, 763, 476.1; 16/21

(56) References Cited

U.S. PATENT DOCUMENTS

| | | | |
|---|---|---|---|
| 2,280,327 A | | 4/1942 | Ware |
| 2,592,219 A | * | 4/1952 | West et al. ................. 280/476 |
| 2,926,930 A | * | 3/1960 | Pease ......................... 280/475 |
| 3,271,050 A | | 9/1966 | Saunders |
| 3,889,981 A | | 6/1975 | Westford |
| 4,219,903 A | * | 9/1980 | Black ............................ 16/21 |
| 4,280,713 A | * | 7/1981 | Bruhn ...................... 280/416.1 |
| 4,372,571 A | * | 2/1983 | Lister ...................... 280/476.1 |
| 4,648,617 A | * | 3/1987 | Hannappel .................. 280/475 |
| 4,807,899 A | * | 2/1989 | Belcher ....................... 280/477 |
| 4,889,357 A | * | 12/1989 | Perry .......................... 280/475 |
| 5,184,840 A | | 2/1993 | Edwards |
| 5,695,204 A | | 12/1997 | Ford |
| D399,803 S | | 10/1998 | Hilmen |
| 6,222,457 B1 | * | 4/2001 | Mills et al. ................. 280/477 |

* cited by examiner

Primary Examiner—Brian L. Johnson
Assistant Examiner—Hau Phan

(57) ABSTRACT

A wheel attachment for a trailer hitch for preventing damage to the receiver hitch. The wheel attachment for a trailer hitch includes an elongate support member being adapted to removably and securely extend in a tubular receiver hitch; and also includes at least one wheel support member being rotatably mounted to a bottom side of the elongate support member; and further includes at least one wheel member being rotatably mounted to the at least one wheel support member; and also includes a tongue catch member being securely and removably attached to the elongate support member.

9 Claims, 5 Drawing Sheets

WHEEL ATTACHMENT FOR A TRAILER HITCH

BACKGROUND OF THE INVENTION

1. Field of the Invention

The present invention relates to a trailer hitch caster and more particularly pertains to a new wheel attachment for a trailer hitch for preventing damage to the receiver hitch.

2. Description of the Prior Art

The use of a trailer hitch caster is known in the prior art. More specifically, a trailer hitch caster heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,889,981; U.S. Pat. No. 3,271,050; U.S. Pat. No. 5,695,204; U.S. Pat. No. Des. 399,803; U.S. Pat. No. 5,184,840; and U.S. Pat. No. 2,280,327.

While these devices fulfill their respective, particular objectives and requirements, the aforementioned patents do not disclose a new wheel attachment for a trailer hitch. The inventive device includes an elongate support member being adapted to removably and securely extend in a tubular receiver hitch; and also includes at least one wheel support member being rotatably mounted to a bottom side of the elongate support member; and further includes at least one wheel member being rotatably mounted to the at least one wheel support member; and also includes a tongue catch member being securely and removably attached to the elongate support member.

In these respects, the wheel attachment for a trailer hitch according to the present invention substantially departs from the conventional concepts and designs of the prior art, and in so doing provides an apparatus primarily developed for the purpose of preventing damage to the receiver hitch.

SUMMARY OF THE INVENTION

In view of the foregoing disadvantages inherent in the known types of trailer hitch caster now present in the prior art, the present invention provides a new wheel attachment for a trailer hitch construction wherein the same can be utilized for preventing damage to the receiver hitch.

The general purpose of the present invention, which will be described subsequently in greater detail, is to provide a new wheel attachment for a trailer hitch which has many of the advantages of the trailer hitch caster mentioned heretofore and many novel features that result in a new wheel attachment for a trailer hitch which is not anticipated, rendered obvious, suggested, or even implied by any of the prior art trailer hitch caster, either alone or in any combination thereof.

To attain this, the present invention generally comprises an elongate support member being adapted to removably and securely extend in a tubular receiver hitch; and also includes at least one wheel support member being rotatably mounted to a bottom side of the elongate support member; and further includes at least one wheel member being rotatably mounted to the at least one wheel support member; and also includes a tongue catch member being securely and removably attached to the elongate support member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wheel attachment for a trailer hitch which has many of the advantages of the trailer hitch caster mentioned heretofore and many novel features that result in a new wheel attachment for a trailer hitch which is not anticipated, rendered obvious, suggested, or even implied by any of the prior art trailer hitch caster, either alone or in any combination thereof.

It is another object of the present invention to provide a new wheel attachment for a trailer hitch which may be easily and efficiently manufactured and marketed.

It is a further object of the present invention to provide a new wheel attachment for a trailer hitch which is of a durable and reliable construction.

An even further object of the present invention is to provide a new wheel attachment for a trailer hitch which is susceptible of a low cost of manufacture with regard to both materials and labor, and which accordingly is then susceptible of low prices of sale to the consuming public, thereby making such wheel attachment for a trailer hitch economically available to the buying public.

Still yet another object of the present invention is to provide a new wheel attachment for a trailer hitch which provides in the apparatuses and methods of the prior art some of the advantages thereof, while simultaneously overcoming some of the disadvantages normally associated therewith.

Still another object of the present invention is to provide a new wheel attachment for a trailer hitch for preventing damage to the receiver hitch.

Yet another object of the present invention is to provide a new wheel attachment for a trailer hitch which includes an elongate support member being adapted to removably and securely extend in a tubular receiver hitch; and also includes at least one wheel support member being rotatably mounted to a bottom side of the elongate support member; and further includes at least one wheel member being rotatably mounted to the at least one wheel support member; and also includes a tongue catch member being securely and removably attached to the elongate support member.

Still yet another object of the present invention is to provide a new wheel attachment for a trailer hitch that is easy and convenient to attach to an existing receiver hitch.

Even still another object of the present invention is to provide a new wheel attachment for a trailer hitch that prevents the hitch to bang upon the road or ground when moving through a dip in the roadway.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
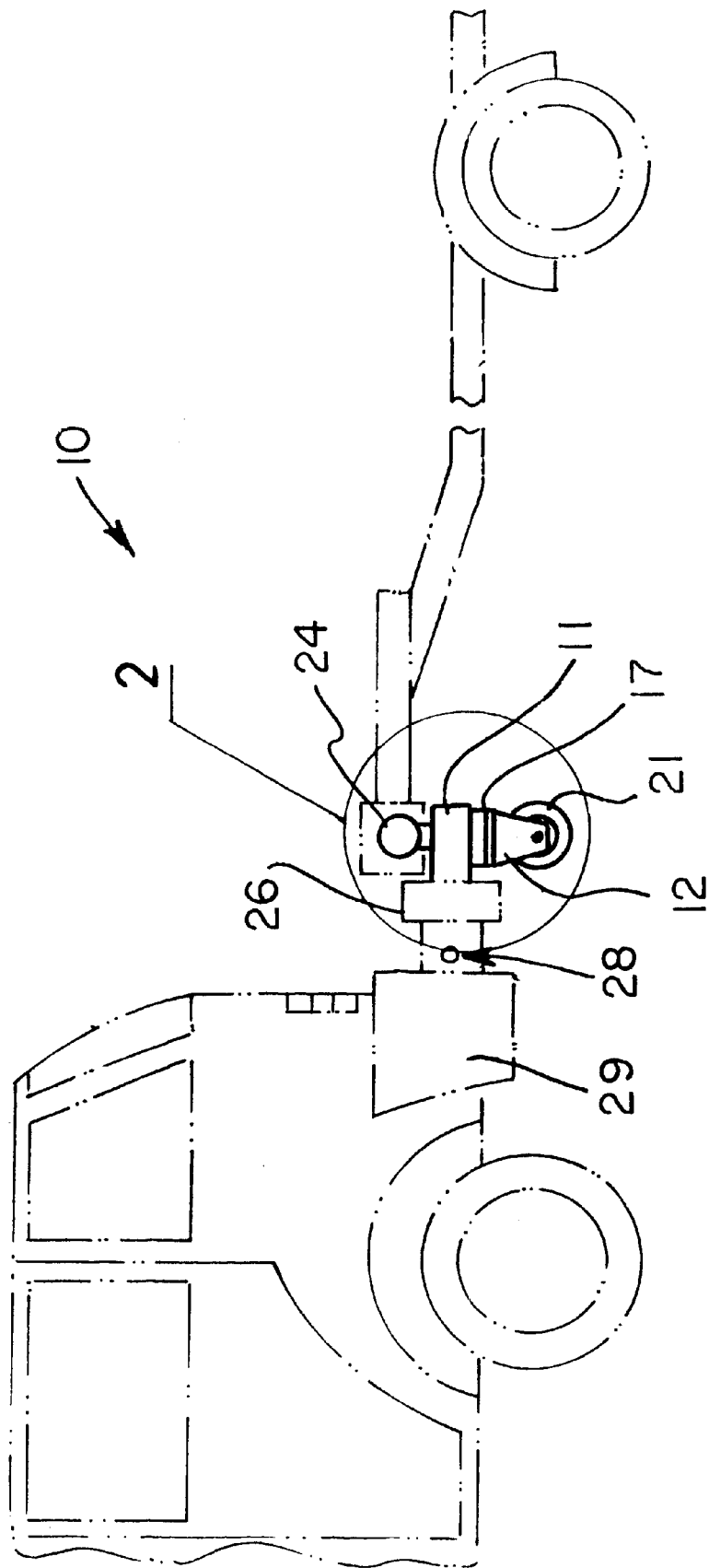
FIG. 1 is a side elevational view of a new wheel attachment for a trailer hitch according to the present invention and shown in use.
Figure 2:
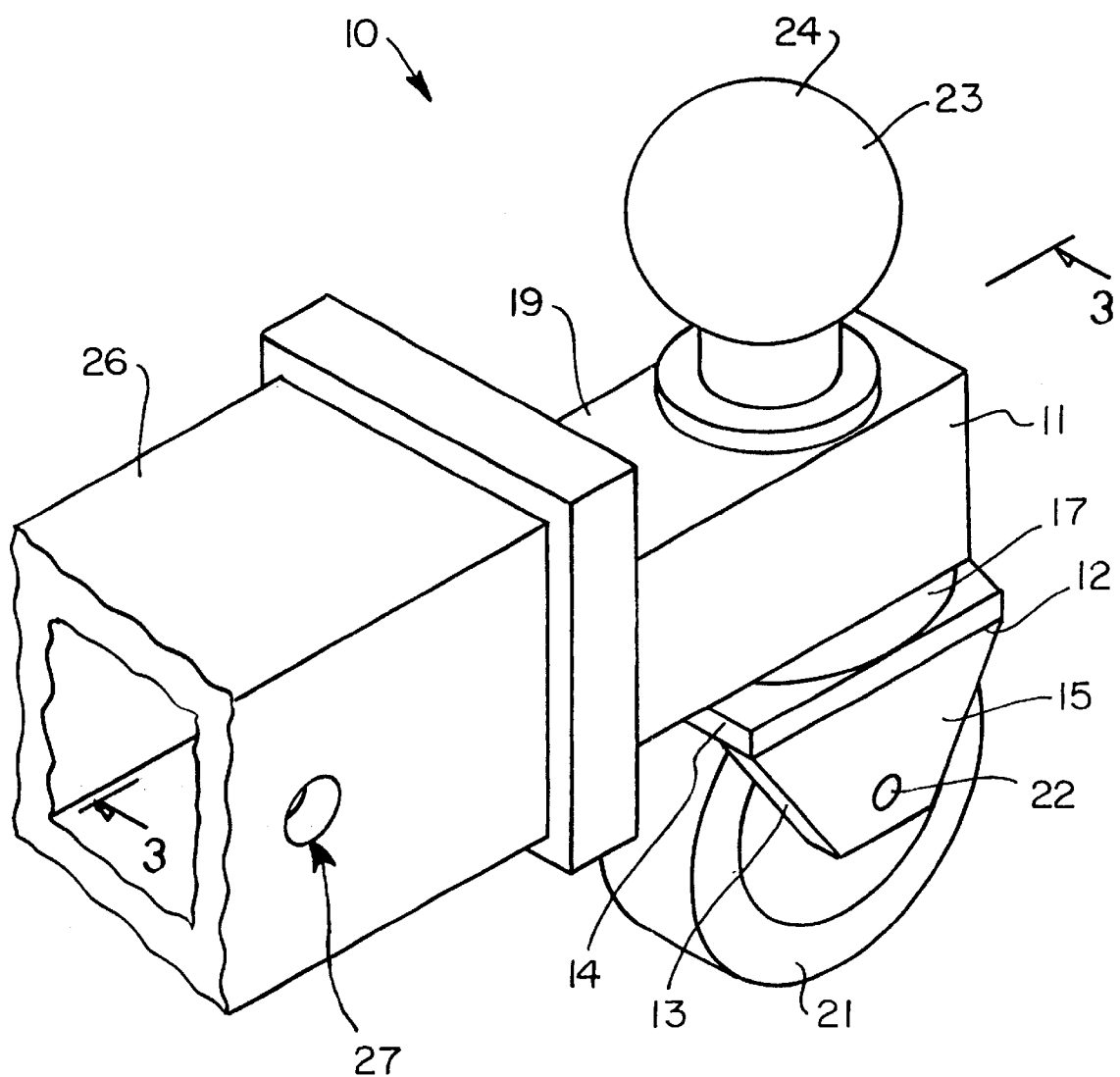
FIG. 2 is a perspective view of the present invention.
Figure 3:
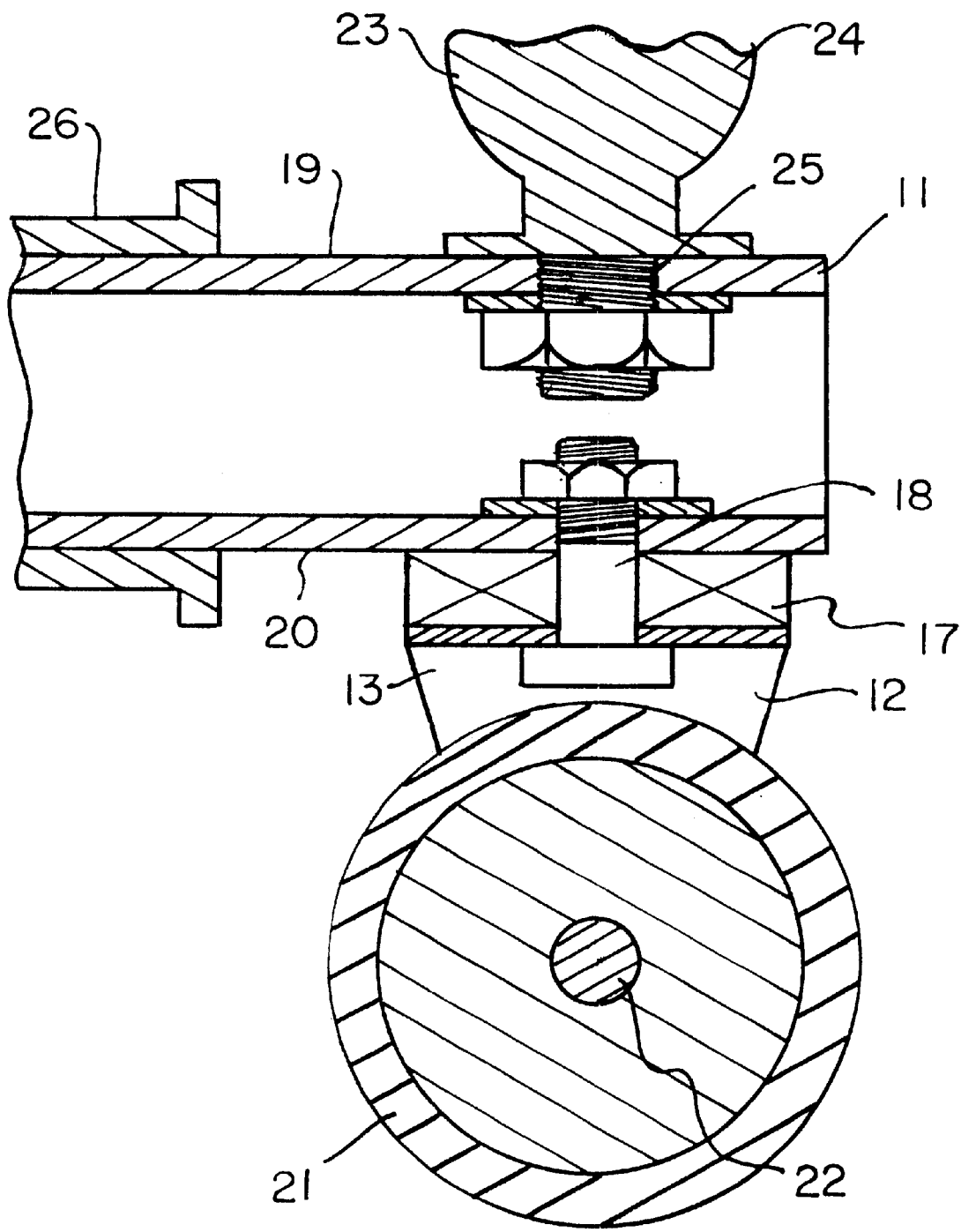
FIG. 3 is a cross-sectional view of the present invention.
Figure 4:
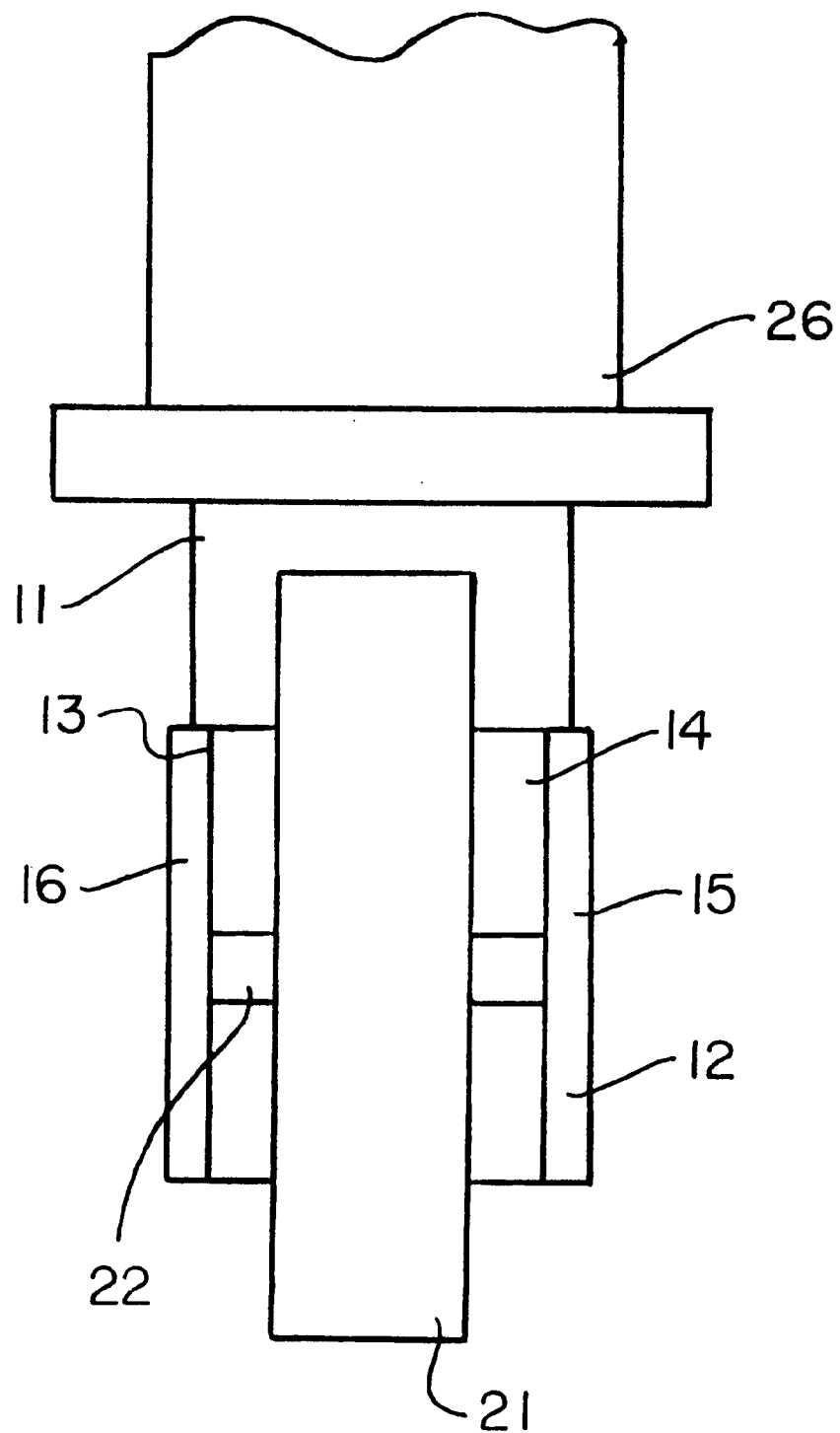
FIG. 4 is an bottom plan view of the present invention.
Figure 5:
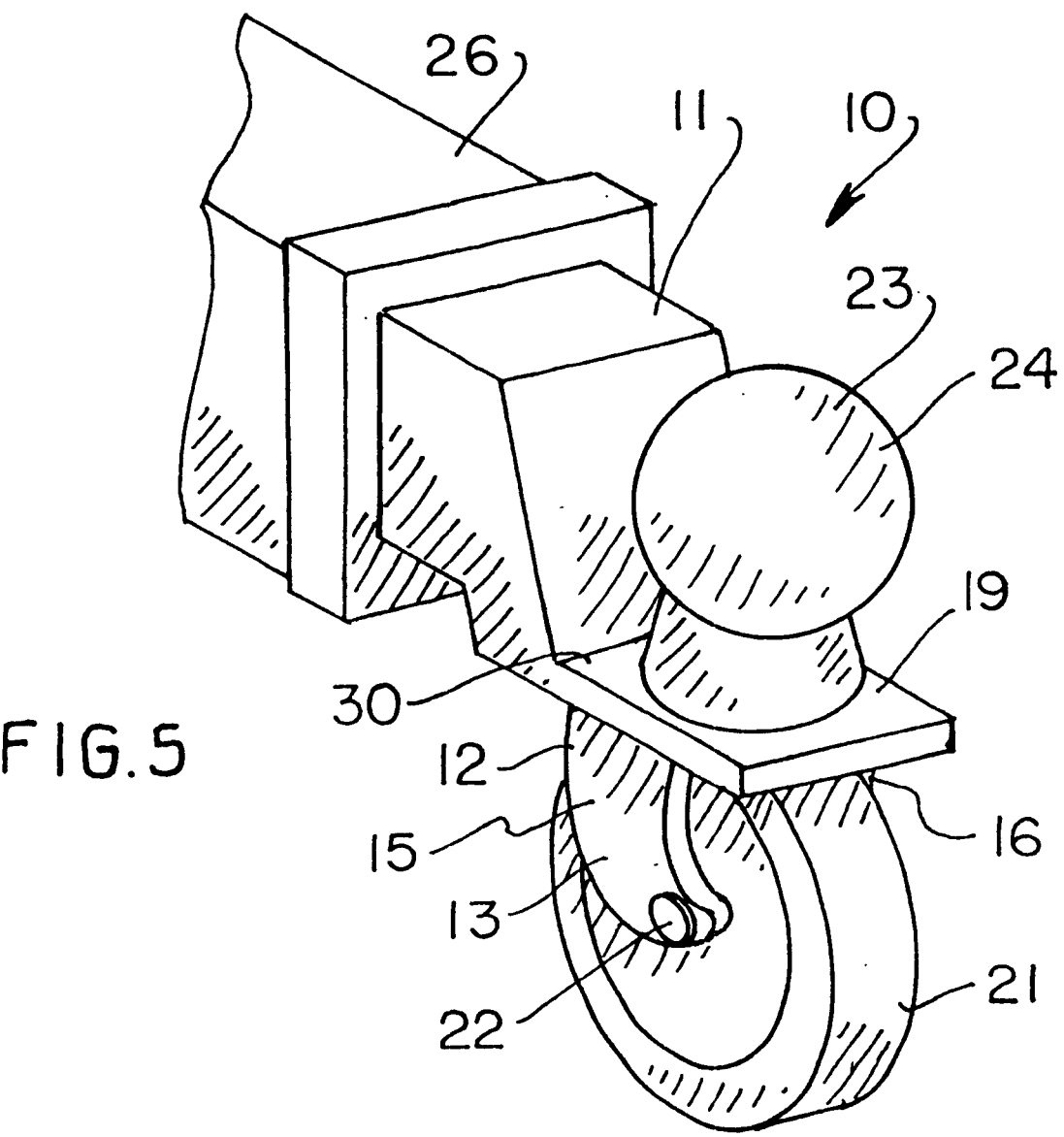
FIG. 5 is a perspective view of a second embodiment of the present invention.

With reference now to the drawings, and in particular to FIGS. 1 through 5 thereof, a new wheel attachment for a trailer hitch embodying the principles and concepts of the present invention and generally designated by the reference numeral 10 will be described.

As best illustrated in FIGS. 1 through 5, the wheel attachment for a trailer hitch 10 generally comprises an elongate support member 11 being adapted to removably and securely extend in a tubular receiver hitch 26. The elongate support member 11 is a tubular member which is adapted to be removably received in an open end of the tubular receiver hitch 26 and which is adapted to be fastened to the tubular receiver hitch 26 with a fastening member 28 which is adapted to be inserted through side walls of the elongate support member 11 and the tubular receiver hitch 26 with the elongate support member 11 having a length of approximately 9 inches.

At least one wheel support member 12 is rotatably and conventionally mounted to a bottom side 20 of the elongate support member 11. The at least one wheel support member 12 includes at least one bracket member 13 having a main portion 14 and end portions 15,16 extending outwardly therefrom and being spaced apart, and also includes at least one bearing member 17 being disposed between the at least one bracket member 13 and the elongate support member 11, and further includes at least one fastener 18 being extended through the at least one bracket member 13 and the at least one bearing member 17 and being securely fastened to the elongate support member 11. At least one wheel member 21 is rotatably mounted with a spindle 22 to the at least one wheel support member 12. The at least one wheel member 21 is mounted with the spindle 22 to and between the end portions 15,16 of the at least one bracket member 13 with the at least one wheel member 21 having a diameter of approximately 2 to 3 inches. A tongue catch member 23 is securely and removably attached to the elongate support member 11. The tongue catch member 23 is a hitch ball 24 having a threaded member 25 extending therefrom and being securely fastened to a top side 19 of the elongate support member 11. As a second embodiment, the elongate support member has a plate-like portion 30 extending outwardly therefrom with the ball hitch 23 and the at least one wheel support member 12 being conventionally mounted thereto.

In use, the user fastens the elongate support member 11 to the receiver hitch 26 and as the prime mover 29 is driven along a roadway and through a dip in the roadway, the wheel member 21 will come into contact with the roadway instead of the receiver hitch 26.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for blocking impact between a trailer hitch and a ground surface, comprising:

a vehicle having a tubular receiver hitch extending rearwardly from said vehicle; and a wheel attachment for removably mounting on said receiver hitch, said wheel attachment comprising:

an elongate support member removably mounted in the tubular receiver hitch of said vehicle for supporting said support member in an elevated condition above the ground surface, said elongate support member having a top side for orienting in an upward direction and a bottom side for orienting in a downward direction;

a tongue catch member attached to the top of said elongate support member for extending in an upward direction from said support member;

a wheel support member being rotatably mounted to the bottom side of said elongate support member, said wheel support member being rotatable with respect to said elongate support member about a first axis of rotation;

a wheel member being rotatably mounted to said wheel support member, said wheel member being rotatable with respect to said wheel support member about a second axis of rotation;

wherein said wheel member is supported by said wheel support member in an elevated condition above the ground surface such that said wheel member is spaced from the ground surface when said vehicle is positioned on a level ground surface.

2. A wheel attachment for a trailer hitch as described in claim 1, wherein said first axis of rotation is oriented substantially perpendicular to said second axis of rotation.

3. A wheel attachment for a trailer hitch as described in claim 1, wherein a distance between said second axis of rotation and said elongate support member is approximately one and one-half times a distance between the top and bottom sides of said elongate support member for maximizing a clearance between said wheel member and the ground surface when said support member is mounted on a vehicle.

4. A wheel attachment for a trailer hitch as described in claim 1, wherein said elongate support member is a tubular member which is adapted to be removably received in an open end of the tubular receiver hitch and which is adapted to be fastened to said tubular receiver hitch with a fastening member which is adapted to be inserted through side walls of said elongate support member and the tubular receiver hitch.

5. A wheel attachment for a trailer hitch as described in claim 1, wherein said elongate support member includes a plate-like portion extending therefrom.

6. A wheel attachment for a trailer hitch as described in claim 1, wherein said tongue catch member is a hitch ball having a threaded member extending therefrom and being securely fastened to a top side of said elongate support member.

7. A wheel attachment for a trailer hitch as described in claim 1, wherein said wheel support member includes a bracket member having a main portion and end portions extending outwardly therefrom and being spaced apart, and also includes a bearing member being disposed between said bracket member and said elongate support member, and further includes a fastener being extended through said bracket member and said bearing member and being fastened to said elongate support member.

8. A wheel attachment for a trailer hitch as described in claim 7, wherein said wheel member is mounted to and between said end portions of said bracket member.

9. A vertically-compact wheel attachment for a trailer hitch to block impact between the trailer hitch with a ground surface when the trailer hitch is positioned proximate to the ground surface, said wheel attachment comprising:

an elongate support member for removably mounting in a tubular receiver hitch for orienting said support member in a horizontal orientation, said elongate support member having a top side for orienting in an upward direction and a bottom side for orienting in a downward direction;

a tongue catch member attached to the top of said elongate support member for extending in an upward direction from said support member;

a wheel support member being rotatably mounted to the bottom side of said elongate support member, said wheel support member being rotatable with respect to said elongate support member about a first axis of rotation;

a wheel member being rotatably mounted to said wheel support member, said wheel member being rotatable with respect to said wheel support member about a second axis of rotation;

wherein said first axis of rotation is oriented substantially perpendicular to said second axis of rotation;

wherein a distance between said second axis of rotation and said elongate support member is approximately one and one-half times a distance between the top and bottom sides of said elongate support member for maximizing a clearance between said wheel member and the ground surface when said support member is mounted on a vehicle;

wherein said elongate support member is a tubular member which is adapted to be removably received in an open end of the tubular receiver hitch and which is adapted to be fastened to said tubular receiver hitch with a fastening member which is adapted to be inserted through side walls of said elongate support member and the tubular receiver hitch;

wherein said elongate support member includes a plate-like portion extending therefrom;

wherein said tongue catch member is a hitch ball having a threaded member extending therefrom and being securely fastened to a top side of said elongate support member;

wherein said wheel support member includes a bracket member having a main portion and end portions extending outwardly therefrom and being spaced apart, and also includes a bearing member being disposed between said bracket member and said elongate support member, and further includes a fastener being extended through said bracket member and said bearing member and being fastened to said elongate support member;

wherein said wheel member is mounted to and between said end portions of said bracket member;

wherein said first axis of rotation intersects said second axis of rotation; and wherein said first axis of rotation passes through said tongue catch member.

* * * * *